United States Patent
Kitamura et al.

(10) Patent No.: US 11,821,358 B2
(45) Date of Patent: Nov. 21, 2023

(54) VARIABLE GEOMETRY TURBOCHARGER

(71) Applicant: MITSUBISHI HEAVY INDUSTRIES ENGINE & TURBOCHARGER, LTD., Sagamihara (JP)

(72) Inventors: Tsuyoshi Kitamura, Tokyo (JP); Hokuto Isoda, Tokyo (JP); Yosuke Dammoto, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/782,845

(22) PCT Filed: Dec. 26, 2019

(86) PCT No.: PCT/JP2019/051173
§ 371 (c)(1),
(2) Date: Jun. 6, 2022

(87) PCT Pub. No.: WO2021/130972
PCT Pub. Date: Jul. 1, 2021

(65) Prior Publication Data
US 2023/0003222 A1   Jan. 5, 2023

(51) Int. Cl.
*F02B 39/00* (2006.01)
*F02B 37/22* (2006.01)
(Continued)

(52) U.S. Cl.
CPC ............ *F02B 39/005* (2013.01); *F02B 37/22* (2013.01); *F02B 37/24* (2013.01); *F04D 29/284* (2013.01); *F04D 29/441* (2013.01)

(58) Field of Classification Search
CPC ........ F02B 39/005; F02B 37/22; F02B 37/24; F04D 29/284; F04D 29/441; F05D 2220/40; Y02T 10/12; F02C 6/12
See application file for complete search history.

(56) References Cited

U.S. PATENT DOCUMENTS

2018/0149078 A1* 5/2018 Sakamoto ............. F01D 17/165

FOREIGN PATENT DOCUMENTS

JP    59-97238 U     7/1984
JP    59-168534 U   11/1984
(Continued)

OTHER PUBLICATIONS

Machine Translation of WO2016120947-A1 (Year: 2016).*
(Continued)

*Primary Examiner* — Brandon D Lee
(74) *Attorney, Agent, or Firm* — Birch, Stewart, Kolasch & Birch, LLP

(57) ABSTRACT

A variable geometry turbocharger according to an embodiment includes a rotational shaft; a turbine wheel disposed on one end side of the rotational shaft; a compressor wheel disposed on another end side of the rotational shaft; a bearing housing for housing a bearing part for rotatably supporting the rotational shaft; a variable nozzle structure for controlling a flow rate of an exhaust gas flowing into the turbine wheel, the variable nozzle structure including a nozzle plate and nozzle mount that define an exhaust gas flow passage for allowing the exhaust gas to flow into the turbine wheel, a nozzle vane disposed rotatably about a support shaft in the exhaust gas flow passage, and a drive part for rotating the nozzle vane, the drive part being disposed in an internal space defined between the bearing housing and the nozzle mount; and a cooling gas passage for extracting compressed gas compressed by the compressor wheel and introducing the compressed gas into the internal space.

8 Claims, 7 Drawing Sheets

(51) Int. Cl.
*F04D 29/28* (2006.01)
*F04D 29/44* (2006.01)
*F02B 37/24* (2006.01)

(56) References Cited

FOREIGN PATENT DOCUMENTS

| JP | 61-19602 U | 2/1986 | |
|---|---|---|---|
| JP | 62-135802 U | 8/1987 | |
| JP | 2004-232622 A | 8/2004 | |
| JP | 2008-169788 A | 7/2008 | |
| JP | 2012-62808 A | 3/2012 | |
| JP | 2013-164040 A | 8/2013 | |
| WO | WO2016/120947 A1 | 8/2016 | |
| WO | WO-2016120947 A1 * | 8/2016 | .............. F02B 37/00 |

OTHER PUBLICATIONS

International Preliminary Report on Patentability and English translation of the Written Opinion of the International Searching Authority for International Application No. PCT/JP2019/051173, dated Jul. 7, 2022.
International Search Report for International Application No. PCT/JP2019/051173, dated Mar. 17, 2020.
Japanese Notice of Reasons for Refusal for Japanese Application No. 2021-566691, dated May 16, 2023, with an English translation.

* cited by examiner

View A

VARIABLE GEOMETRY TURBOCHARGER

TECHNICAL FIELD

The present disclosure relates to a variable geometry turbocharger.

BACKGROUND

An exhaust turbocharger supercharges air supplied to an engine, by using energy of an exhaust gas discharged from the engine. The exhaust turbocharger may be of a variable geometry type equipped with a variable nozzle structure. In the variable nozzle structure, a plurality of nozzle vanes are rotatably supported between a nozzle mount and a nozzle plate, and a vane angle of each of the nozzle vanes can be changed. By changing the vane angle of the nozzle vane, it is possible to make a flow-passage area of the exhaust gas supplied to the turbine wheel variable, making it possible to adjust a flow velocity or a supply amount of the exhaust gas supplied to the turbine wheel and to regulate a boost pressure of air supplied to the engine.

A temperature of the exhaust gas supplied to a turbine housing of the exhaust turbocharger is around 800° C. for a diesel engine and around 1,000° C. for a gasoline engine, and durability of the members against the increasing temperature of the exhaust gas is a problem. An exhaust turbocharger disclosed in Patent Document 1 aims to improve thermal cycle efficiency by increasing a temperature of the exhaust gas at an inlet of the turbine housing to not lower than 1,000° C. In Patent Document 1, a cooling hole is formed in the turbine wheel, and compressed air on a compressor side is supplied to the cooling hole to cool the turbine wheel, thereby taking measures against a high-temperature environment.

CITATION LIST

Patent Literature

Patent Document 1: JP2004-232622A

SUMMARY

Technical Problem

In a variable geometry turbocharger, there is a problem that, for example, thermal deformation in a nozzle mount due to an increasing temperature of an exhaust gas causes a nozzle shaft to stick to the nozzle mount, which disables a rotation of the nozzle vane, or promotes wear of a drive ring, a lever plate, or the like forming a variable nozzle structure under high temperature.

The present disclosure was made in view of the above problem, and an object of the present disclosure is to solve the above-described problem concerning the constituent member of the variable geometry turbocharger caused by the increasing temperature of the exhaust gas.

Solution to Problem

In order to achieve the above object, a variable geometry turbocharger according to the present disclosure includes a rotational shaft; a turbine wheel disposed on one end side of the rotational shaft; a compressor wheel disposed on another end side of the rotational shaft; a bearing housing for housing a bearing part for rotatably supporting the rotational shaft; a variable nozzle structure for controlling a flow rate of an exhaust gas flowing into the turbine wheel, the variable nozzle structure including a nozzle plate and nozzle mount that define an exhaust gas flow passage for allowing the exhaust gas to flow into the turbine wheel, a nozzle vane disposed rotatably about a support shaft in the exhaust gas flow passage, and a drive part for rotating the nozzle vane, the drive part being disposed in an internal space defined between the bearing housing and the nozzle mount; and a cooling gas passage for extracting compressed gas compressed by the compressor wheel and introducing the compressed gas into the internal space.

Advantageous Effects

With a variable geometry turbocharger according to the present disclosure, even if a temperature of an exhaust gas increases, it is possible to suppress thermal deformation, wear under high temperature, or the like in the configuration of a variable nozzle structure including, for example, a nozzle mount, a drive ring, a lever plate, and the like, under a high-temperature environment.

DETAILED DESCRIPTION

Figure 1:
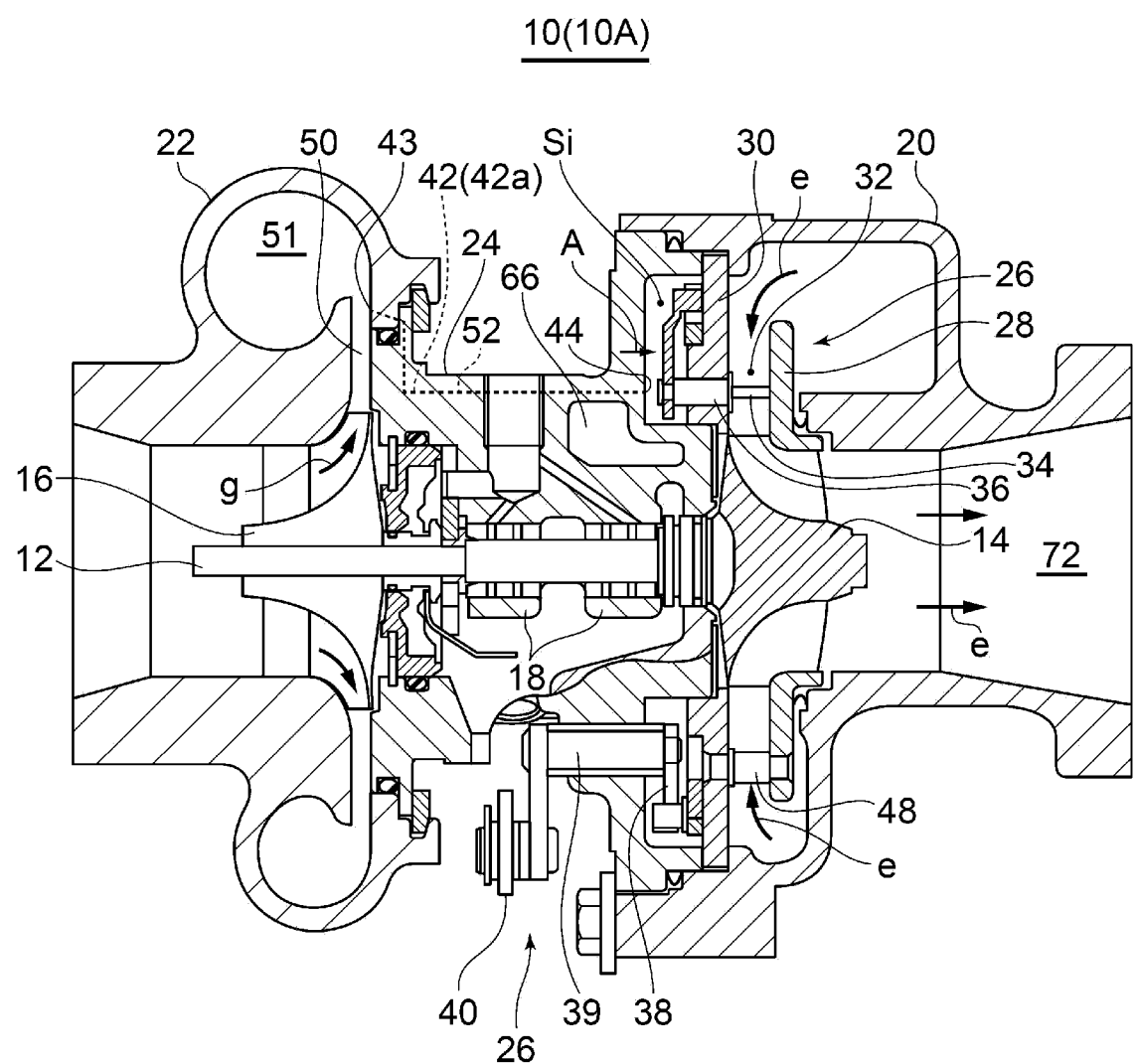
FIG. 1 is a longitudinal cross-sectional view of a variable geometry turbocharger according to an embodiment.

Some embodiments of the present invention will be described below with reference to the accompanying drawings. It is intended, however, that unless particularly specified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, an expressions such as "comprising", "including", "having", "containing", and "constituting" one constitutional element are not intended to be exclusive of other constitutional elements.

FIGS. 1 to 7 show variable geometry turbochargers 10 (10A, 10B, 10C, 10D) according to some embodiments. In each of these variable geometry turbochargers 10, a rotational shaft 12 is disposed laterally at the center of a housing, a turbine wheel 14 is disposed on one end side of the rotational shaft 12, and a compressor wheel 16 is disposed on another end side of the rotational shaft 12. A housing for housing these members is composed of a turbine housing 20 for housing the turbine wheel 14, a compressor cover 22 for housing the compressor wheel 16, and a bearing housing 24 disposed between the turbine housing 20 and the compressor cover 22 to house bearing parts 18 for rotatably supporting the rotational shaft 12.

Further, the turbine housing 20 internally includes a variable nozzle structure 26 for controlling the flow rate of an exhaust gas e flowing into the turbine wheel 14. The variable nozzle structure 26 includes a nozzle plate 28 and a nozzle mount 30, and the nozzle plate 28 and the nozzle mount 30 define an exhaust gas flow passage 32 for allowing the exhaust gas e to flow into the turbine wheel 14. A nozzle vane 34 is disposed rotatably about a support shaft 36 in the exhaust gas flow passage 32. An internal space Si is defined between the bearing housing 24 and the nozzle mount 30, and a drive part 38 for rotating the nozzle vane 34 is disposed in the internal space Si. In addition, a cooling gas passage 42 (42a, 42b) for extracting compressed gas g (for example, compressed air) compressed by the compressor wheel 16 and introducing the compressed gas g into the internal space Si is provided.

With such configuration, the members forming the variable nozzle structure 26 can be cooled by supplying the compressed gas g compressed by the compressor wheel 16 to the internal space Si through the cooling gas passage 42, making it possible to suppress thermal deformation or wear of these members in the turbine housing 20 into which the high-temperature exhaust gas e is introduced.

Figure 2:
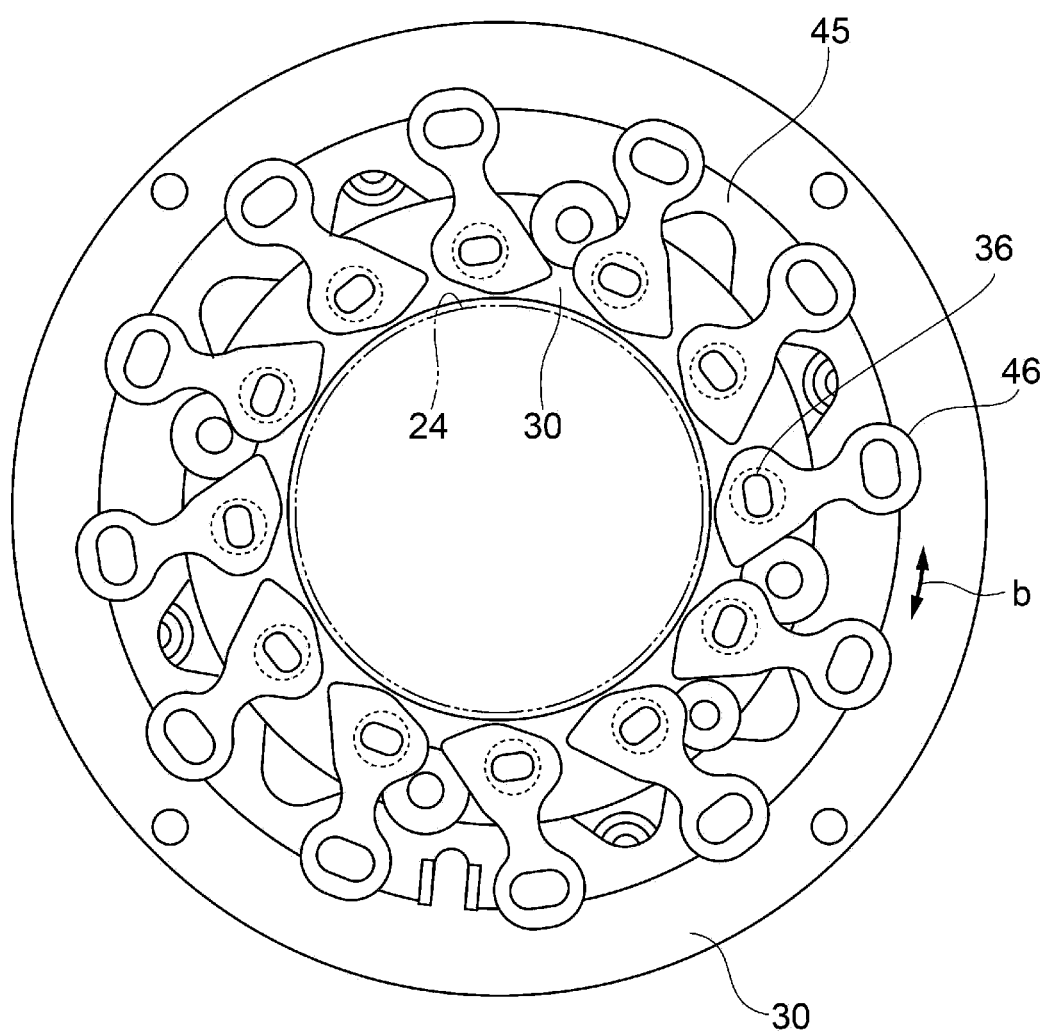
FIG. 2 is a view seen from a direction A in FIG. 1.

FIG. 2 is a view seen from a direction of an arrow A in FIG. 1. In an embodiment, as shown in FIG. 2, the drive part 38 of the variable nozzle structure 26 disposed in the internal space Si includes a drive ring 45 and a lever plate 46 as constituent members. A plurality of lever plates 46 each have one end connected to the drive ring 45 and another end coupled to the support shaft 36 of the nozzle vane 34, and are disposed along the circumferential direction of the drive ring 45. The drive ring 45 rotates about an axis of the rotational shaft 12 in a direction of an arrow b, thereby rotating the nozzle vane 34 about the support shaft 36. Thus, it is possible to adjust a flow velocity or a supply amount of the exhaust gas e passing through the exhaust gas flow passage 32 and to regulate a boost pressure of air supplied to an engine. The drive part 38 disposed in the internal space Si is coupled to an actuator 40 disposed outside the bearing housing 24 via a connecting part 39, and is actuated by the actuator 40. The connecting part 39 penetrates the bearing housing 24 and is guided to the outside of the bearing housing 24.

In an embodiment, a nozzle support 48 is erected between the nozzle plate 28 and the nozzle mount 30 in order to fix the nozzle plate 28 and the nozzle mount 30 defining the exhaust gas flow passage 32 at predetermined positions. A plurality of nozzle supports 48 are discretely disposed in the circumferential direction of the nozzle mount 30.

In an embodiment, as shown in FIG. 1, a scroll flow passage 51 is formed in the compressor cover 22. A diffuser flow passage 50 is formed on an outlet side of the compressor wheel 16, and kinetic energy of the compressed gas g discharged from the compressor wheel 16 is converted into pressure energy in a diffuser flow passage 50. The cooling gas passage 42 has an inlet side opening 43 communicating with an outlet side region of the diffuser flow passage 50 where the compressor wheel 16 is housed. The cooling gas passage 42 is configured such that the inlet side opening 43 opens to the outlet side region of the diffuser flow passage 50 and the compressed gas g is extracted from the outlet side region of the diffuser flow passage 50 and introduced into the internal space Si. Thus, it is possible to supply the compressed gas g increased in pressure through the diffuser flow passage 50 to the internal space Si. With a pressure difference between the inlet side and the outlet side of the cooling gas passage 42, it is possible to easily supply the compressed gas g to the internal space Si without requiring other power.

Figure 3:
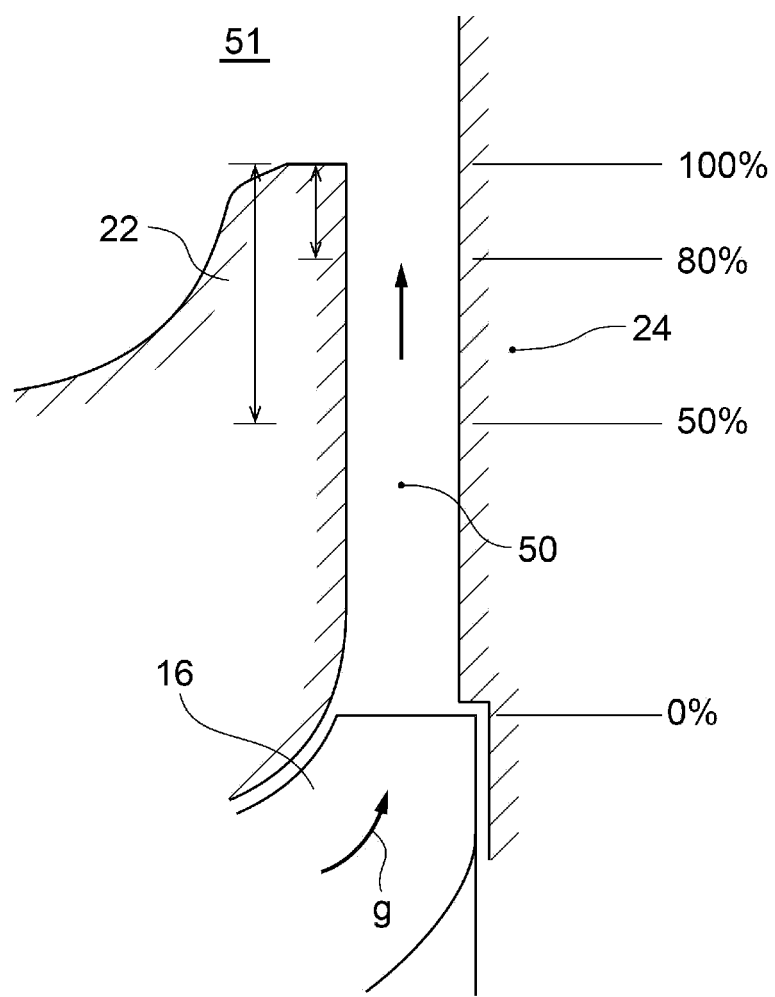
FIG. 3 is an enlarged explanatory view of a part of FIG. 1.

FIG. 3 is an enlarged view showing the diffuser flow passage 50. As shown in FIG. 3, assuming that an inlet of the diffuser flow passage 50 is 0% and an outlet is 100%, the "outlet side region of the diffuser flow passage 50" referred to in the present specification indicates a 50% to 100% region where the pressure of the compressed gas g is high and a region facing the scroll flow passage 51, and the inlet side opening 43 preferably opens to the region. Preferably, the inlet side opening 43 opens to an 80% to 100% outlet side region of the diffuser flow passage 50 or the region facing the scroll flow passage 51. However, since the long cooling gas passage 42 has to be formed in a region of the scroll flow passage 51 which is distant from the outlet of the diffuser flow passage 50, the cooling gas passage 42 preferably opens to a region near the outlet of the diffuser flow passage 50.

Figure 5:
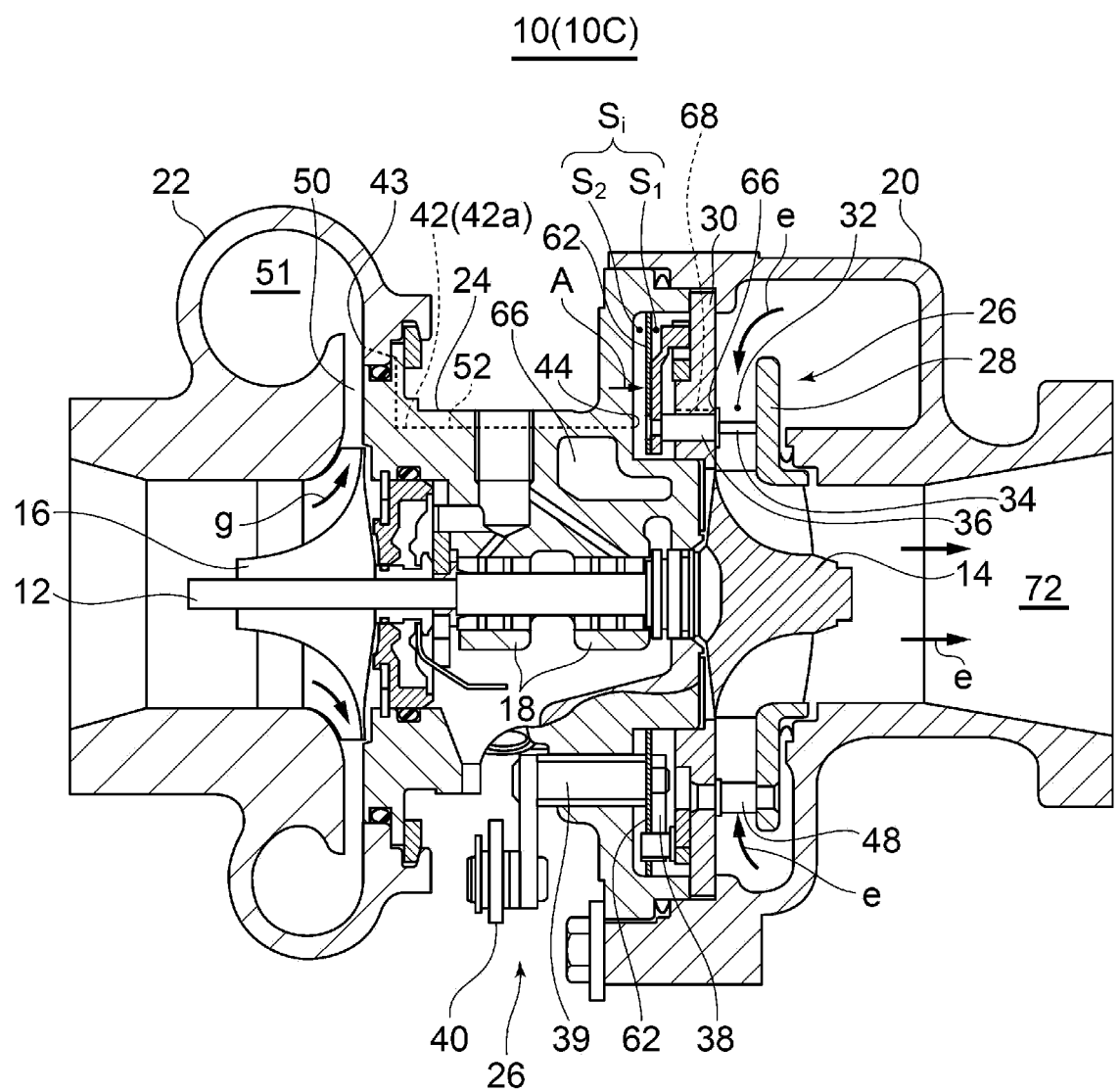
FIG. 5 is a longitudinal cross-sectional view of a variable geometry turbocharger according to an embodiment.
Figure 7:
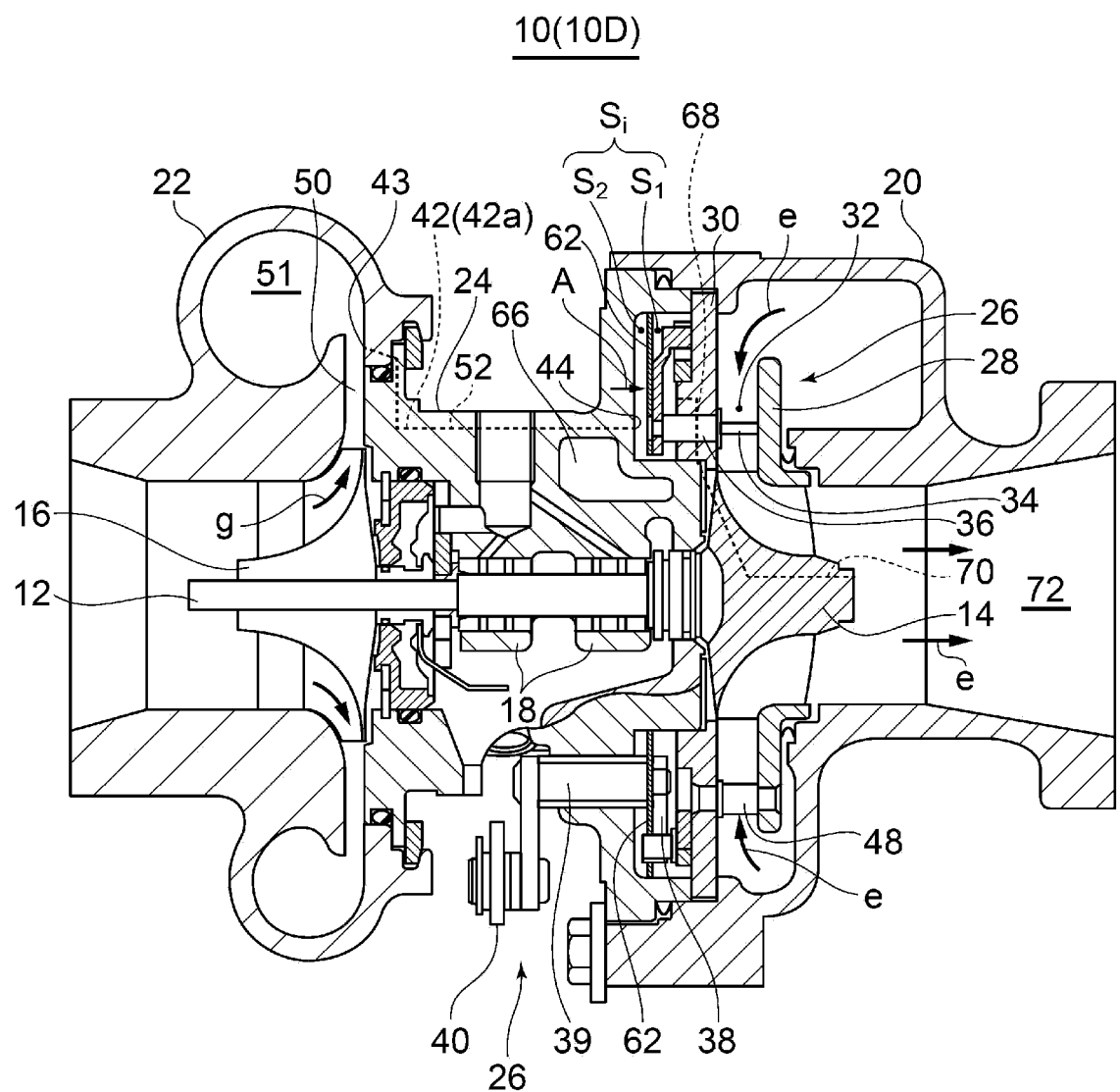
FIG. 7 is a longitudinal cross-sectional view of a variable geometry turbocharger according to an embodiment.

In some embodiments, as shown in FIGS. 1, 5, and 7, the bearing housing 24 has a through hole 52 (first through hole) penetrating along the axial direction of the rotational shaft 12, and the through hole 52 constitutes a part of the cooling gas passage 42 (42a). In the present embodiment, the compressed gas g extracted in the outlet side region of the diffuser flow passage 50 is configured to flow through the through hole 52 and reach the internal space Si. Thus, since a part of the cooling gas passage 42 (42a) can be formed inside the bearing housing 24, no space for the cooling gas passage is required outside the bearing housing 24.

Figure 4:
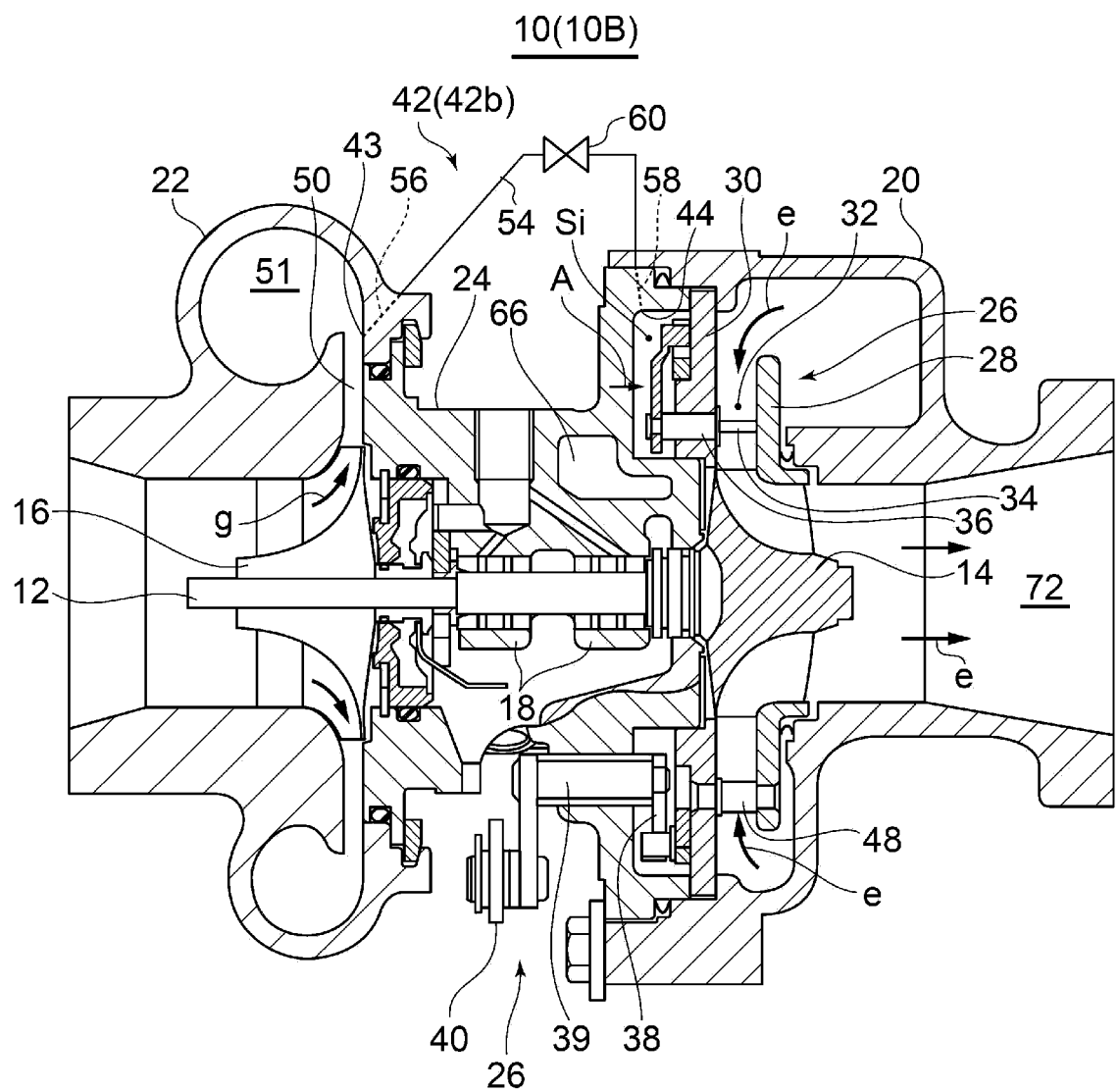
FIG. 4 is a longitudinal cross-sectional view of a variable geometry turbocharger according to an embodiment.

In an embodiment, as shown in FIG. 4, an external pipe 54 is erected between the compressor cover 22 and the bearing housing 24, and the external pipe 54 constitutes a part of the cooling gas passage 42 (42b). In the present embodiment, the cooling gas passage 42 (42b) is constituted by a flow passage 56 formed on a partition wall of the compressor cover 22, the external pipe 54, and a flow passage 58 formed on a partition wall of the bearing housing 24. According to the present embodiment, since a part of the cooling gas passage 42 (42b) can be formed outside the bearing housing 24 by the external pipe 54, the cooling gas passage 42 is formed relatively easily.

In an embodiment, the external pipe 54 may be provided with a check valve 60 for preventing the compressed gas g from flowing back from the internal space Si to the side of the compressor cover 22. Further, although not shown, a check valve having the same function may be provided in the through hole 52.

Figure 6:
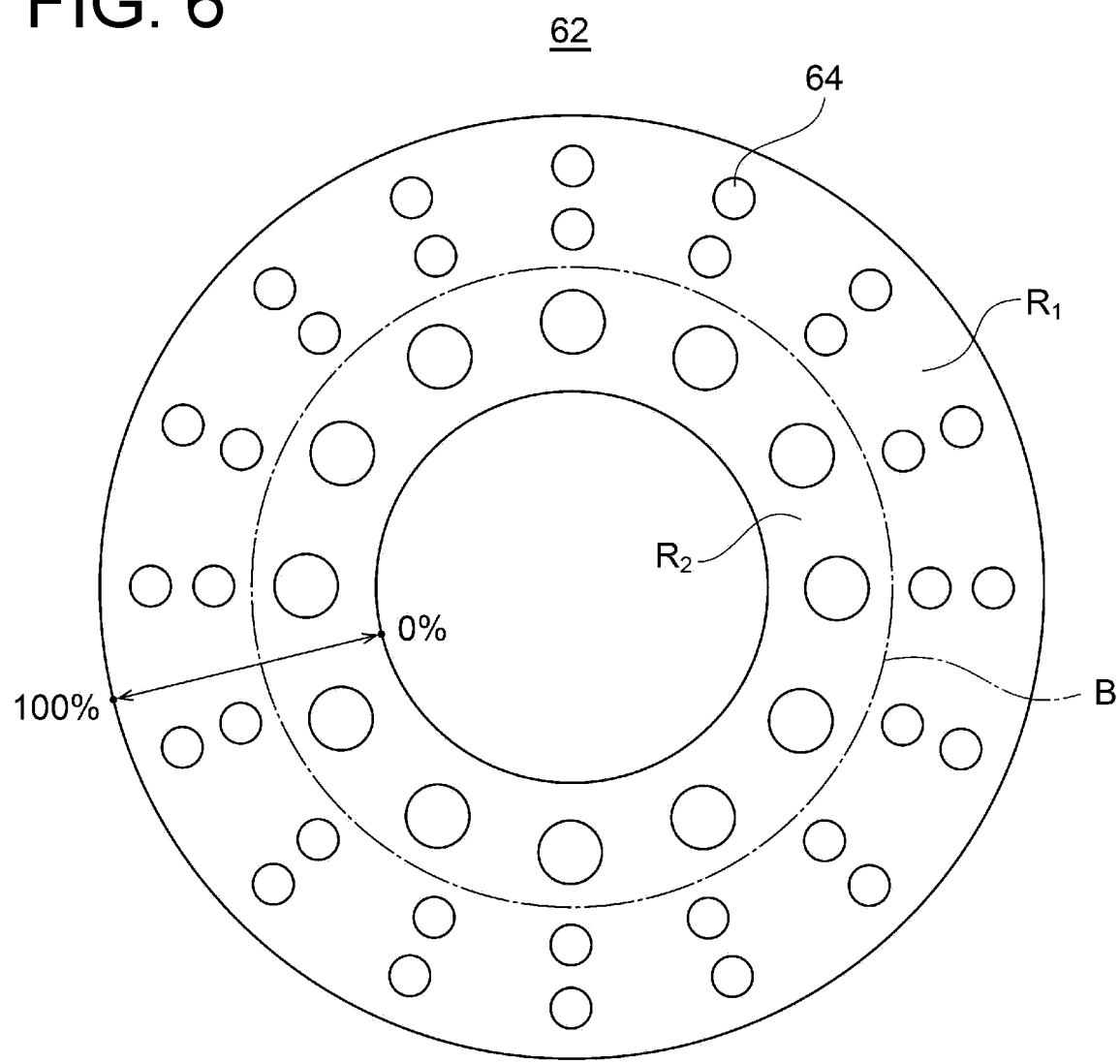
FIG. 6 is a front view of a perforated plate according to an embodiment.

In an embodiment, as shown in FIG. 1, the cooling gas passage 42 (42a) has an outlet side opening 44 communicating with the internal space Si. Further, as shown in FIGS. 5 to 7, a perforated plate 62 is provided in the internal space Si. The internal space Si is divided into two spaces $S_1$ and $S_2$ along the axial direction of the rotational shaft 12 by the perforated plate 62 extending along a direction orthogonal to the rotational shaft 12. The drive ring 45, the lever plate 46, and the like constituting the drive part 38 are disposed in the space Si (one side space) divided on the side of the exhaust gas flow passage 32 by the perforated plate 62. The outlet side opening 44 communicates with the space $S_2$ (the other side space) formed on the side of the compressor cover 22 by the perforated plate 62.

According to the present embodiment, the compressed gas g supplied from the outlet side opening 44 to the space $S_2$ of the internal space Si is dispersed in jets spout from a plurality of perforated plates 62 when passing through through holes of the perforated plates 62, as well as rectified and accelerated. The jets collide with the drive ring 45, the lever plate 46, the nozzle mount 30, and the like disposed in the space $S_2$ as jets, performing so-called jet cooling (impingement cooling). Thus, it is possible to improve a cooling effect on these members.

In an embodiment, the perforated plate 62 is configured such that the opening ratio of a radially inner region is greater than the opening ratio of a radially outer region. Of the nozzle mount 30, the drive ring 45, and the lever plate 46, it is necessary to preferentially cool the nozzle mount 30 which is closest to the exhaust gas flow passage 32 and is most easily heated. When viewed from the A direction in FIG. 1, as shown in FIG. 2, a region of the nozzle mount 30 visible on the radially inner side of the drive ring 45 is larger than a region of the nozzle mount 30 visible on the radially outer side of the drive ring 45. Further, a region near an outer circumferential end of the nozzle mount 30 is in contact with the bearing housing 24, and thus does not face the internal space Si. Thus, by setting the opening ratio of the radially inner region of the perforated plate 62 to be greater than the opening ratio of the radially outer region, it is possible to increase the flow rate of the compressed gas g colliding with the nozzle mount 30, making it possible to improve the cooling effect on the nozzle mount 30.

FIG. 6 is a front view of the perforated plate 62 according to an embodiment. A plurality of through holes 64 formed in the perforated plate 62 are configured such that an opening ratio $X_2$ of a radially inner region $R_2$ is greater than an opening ratio $X_1$ of a radially outer region $R_1$. Herein, the opening ratios $X_1$ and $X_2$ are defined by:

Opening ratio $X_1$=total area of through holes 64 in region $R_1$/total areas of region $R_1$ (1); and Opening ratio $X_2$=total area of through holes 64 in region $R_2$/total areas of region $R_2$ (2).

The shape, size, number of through holes 64, a pitch between the through holes 62, and the like can appropriately be set. For example, the through hole 64 may have a slit-like shape extending in the circumferential direction or the radial direction.

In FIG. 6, setting an inner circumferential edge of the perforated plate 62 is 0% and an outer circumferential surface is 100%, a boundary B between the region $R_1$ and the region $R_2$ is preferably set in, for example, 30% to 70% (preferably, 40% to 60%) region.

In an embodiment, the face of the perforated plate 62 facing the space $S_2$ is configured to have a higher emissivity than the surface of the nozzle mount 30. Herein, the "emissivity" is an emissivity of thermal radiation of an entire electromagnetic wave including infrared rays, and is defined by:

Emissivity=radiant exitance of object/radiant exitance of black body at same temperature (3).

The temperature increases if the perforated plate 62 absorbs thermal radiation, and the temperature decreases if the perforated plate 62 emits thermal radiation. Since the face of the perforated plate 62 facing the outlet side opening 44 where the cooling gas passage 42 communicates with the internal space Si has the higher emissivity than the surface of the nozzle mount 30, the face of the perforated plate 62 facing the outlet side opening 44 has the lower temperature than the face of the nozzle mount 30 facing the internal space Si. As described above, since the face of the perforated plate 62 facing the outlet side opening 44 has the low temperature, it is possible to enhance the cooling effect on the nozzle mount 30, the drive ring 45, the lever plate 46, and the like. Thus, it is possible to suppress thermal deformation or thermal burnout in these members.

As a means for increasing the emissivity of the face of the perforated plate 62, there is a means, for example, surface treatment such as application of a black paint to the face, giving unevenness to the face, roughening the face, or the like.

In an embodiment, as shown in FIGS. 5 and 7, a cooling water passage 66 to which cooling water is supplied is formed in the bearing housing 24. It is possible to cool the bearing housing 24 by circulating cooling water in the cooling water passage 66. By combining the cooling means for the bearing housing 24 and the above-described cooling means for the face of the perforated plate 62 facing the outlet side opening 44, it is possible to further enhance the cooling effect on the nozzle mount 30, the drive ring 45, the lever plate 46, and the like.

In an embodiment, as shown in FIG. 5, a through hole 68 (second through hole) causing the internal space Si to communicate with the exhaust gas flow passage 32 is formed in the nozzle mount 30, and the compressed gas g introduced into the internal space Si is configured to be introduced into the exhaust gas flow passage 32 through the through hole 68. According to the present embodiment, since the compressed gas g is introduced into the exhaust gas flow passage 32 through the through hole 68, it is possible to cool the exhaust gas e flowing through the exhaust gas flow passage 32, making it possible to cool the nozzle mount 30, the drive ring 45, the lever plate 46, and the like. Further, the compressed gas g passing through the through hole 68 is added to the exhaust gas e flowing through the exhaust gas flow passage 32, increasing the flow rate of the exhaust gas supplied to the turbine wheel 14. Thus, it is possible to increase the output of the turbine wheel 14.

In an embodiment, an outlet opening of the through hole 68 is disposed at the periphery of the nozzle vane 34, for example, in the exhaust gas flow passage 32 on the upstream side or the downstream side. In particular, if the outlet opening of the through hole 68 is disposed such that the compressed gas g flowing out from the outlet opening of the through hole 68 to the exhaust gas flow passage 32 passes through the nozzle vane 34, it is possible to enhance the cooling effect on the nozzle vane 34.

In an embodiment, the turbine wheel 14 is formed with a through hole 70 (third through hole) which causes a back surface side of the turbine wheel 14 to communicate with an exhaust gas outlet flow passage 72 formed downstream of the turbine wheel 14. In the present embodiment, the compressed gas g introduced into the internal space Si flows out to the exhaust gas outlet flow passage 72 through the through hole 68. Thus, it is possible to cool the turbine wheel 14.

The contents described in the above embodiments would be understood as follows, for instance.

(1) A variable geometry turbocharger according one aspect includes a rotational shaft; a turbine wheel disposed on one end side of the rotational shaft; a compressor wheel disposed on another end side of the rotational shaft; a bearing housing for housing a bearing part for rotatably supporting the rotational shaft; a variable nozzle structure (such as the variable nozzle structure 26 shown in FIG. 1) for controlling a flow rate of an exhaust gas flowing into the turbine wheel, the variable nozzle structure (such as the variable nozzle structure 26 shown in FIG. 1) including a nozzle plate and nozzle mount that define an exhaust gas flow passage (such as the exhaust gas flow passage 32 shown in FIG. 1) for allowing the exhaust gas to flow into the turbine wheel, a nozzle vane disposed rotatably about a support shaft in the exhaust gas flow passage, and a drive part (such as the drive part 38 shown in FIG. 1) for rotating the nozzle vane, the drive part being disposed in an internal space (such as the internal space Si shown in FIG. 1) defined between the bearing housing and the nozzle mount; and a cooling gas passage (such as the cooling gas passage 42 (42a) shown in FIG. 1 and the cooling gas passage 42 (42b) shown in FIG. 4) for extracting compressed gas compressed by the compressor wheel and introducing the compressed gas into the internal space.

With such configuration, the nozzle mount or the drive ring, the lever plate, or the like forming the drive part of the variable nozzle structure can be cooled by supplying the compressed gas compressed by the compressor wheel to the internal space defined between the bearing housing and the nozzle mount via the above-described cooling gas passage, making it possible to suppress thermal deformation or wear of these members.

(2) In an embodiment, in the variable geometry turbocharger as defined in (1), the cooling gas passage has an inlet side opening (such as the inlet side opening 43 shown in FIG. 1) communicating with an outlet side region of a diffuser flow passage (such as the diffuser flow passage 50 shown in FIG. 1) where the compressor wheel is housed.

With such configuration, since the inlet side opening of the cooling gas passage opens to the outlet side region of the diffuser flow passage, it is possible to supply the compressed gas increased in pressure through the diffuser flow passage to the above-described internal space. With the pressure difference between the inlet side and the outlet side of the cooling gas passage, it is possible to supply the compressed gas to the outlet side internal space without requiring other power.

(3) In an embodiment, in the variable geometry turbocharger as defined in (1) or (2), the bearing housing has a first through hole (such as the through hole 52 shown in FIG. 1) penetrating along an axial direction of the rotational shaft, and the first through hole constitutes a part of the cooling gas passage.

With such configuration, since a part of the cooling gas passage can be formed inside the bearing housing, no space for the cooling gas passage is required outside the bearing housing.

(4) In an embodiment, the variable geometry turbocharger as defined in (1) or (2) further includes a compressor cover for housing the compressor wheel, and an external pipe (such as the external pipe 54 shown in FIG. 4) disposed between the compressor cover and the bearing housing. The external pipe constitutes a part of the cooling gas passage.

With such configuration, since a part of the cooling gas passage can be formed by the above-described external pipe, the cooling gas passage is formed relatively easily.

(5) In an embodiment, in the variable geometry turbocharger as defined in any one of (1) to (4), the cooling gas passage has an outlet side opening (such as the outlet side opening 44 shown in FIG. 1) communicating with the internal space, and the variable geometry turbocharger further includes a perforated plate (such as the perforated plate 62 shown in FIG. 5) dividing the internal space along an axial direction of the rotational shaft, the perforated plate being disposed in the internal space such that the drive part is disposed in one side space formed on one side of the perforated plate and the outlet side opening communicates with another side space formed on another side of the perforated plate.

With such configuration, the compressed gas supplied to the above-described internal space is dispersed and rectified when passing through the through hole of the above-described perforated plate, as well as accelerated, and thus collides, as a jet, with the constituent member of the variable nozzle structure disposed in the above-described one side space of the internal space, performing so-called jet cooling (impingement cooling). Thus, it is possible to improve the cooling effect on these member.

(6) In an embodiment, in the variable geometry turbocharger as defined in (5), the perforated plate is configured such that an opening ratio of a radially inner region (such as the radially inner region $R_2$ shown in FIG. 6) is greater than an opening ratio of a radially outer region (such as the radially outer region $R_1$ shown in FIG. 6).

With such configuration, an exposed area of the nozzle mount when viewed from upstream of the flow direction of the compressed gas is wider in the radially inner region than in the radially outer region. Thus, by making the opening ratio of the radially outer region greater than that of the radially inner region of the perforated plate, it is possible to increase the flow rate of the compressed gas that collides with the nozzle mount. Thus, it is possible to improve the cooling effect on the nozzle mount.

(7) In an embodiment, in the variable geometry turbocharger as defined in (5) or (6), a face of the perforated plate facing the another side space is configured to have a higher emissivity than a surface of the nozzle mount.

The perforated plate increases in temperature if absorbing thermal radiation, and decreases in temperature if emitting thermal radiation. With the above configuration, since the face of the perforated plate facing the outlet side opening where the cooling gas passage communicates with the internal space has the higher emissivity than the surface of the nozzle mount, the face of the perforated plate facing the outlet side opening has the lower temperature than the nozzle mount. Since the face has the lower temperature than the nozzle mount, it is possible to suppress thermal deformation or thermal burnout in the nozzle mount or the member forming the drive part of the variable nozzle structure.

(8) In an embodiment, in the variable geometry turbocharger as defined in any one of (1) to (7), the nozzle mount has a second through hole (such as the through hole 68 shown in FIG. 5) causing the internal space to communicate with the exhaust gas flow passage, the second through hole being configured to allow the compressed gas introduced into the internal space to flow.

With such configuration, since the compressed gas is introduced into the exhaust gas flow passage through the above-described second through hole, it is possible to cool the exhaust gas flowing through the exhaust gas flow passage, making it possible to cool the nozzle mount facing the exhaust gas flow passage, the nozzle plate, the nozzle vane, and the like. Further, the compressed gas passing through the second through hole is added to the exhaust gas flowing through the exhaust gas flow passage, increasing the flow rate of the exhaust gas supplied to the turbine wheel. Thus, it is possible to increase the output of the turbine wheel.

(9) In an embodiment, in the variable geometry turbocharger as defined in any one of (1) to (8), the turbine wheel has a third through hole (such as the through hole 70 shown in FIG. 7) which causes a back surface side of the turbine wheel to communicate with an exhaust gas outlet flow passage formed downstream of the turbine wheel.

With such configuration, since the compressed gas introduced into the internal space passes through the above-described third through hole, it is possible to cool the turbine wheel.

REFERENCE SIGNS LIST

10 (10A, 10B, 10C, 10D) Variable geometry turbocharger
12 Rotational shaft
14 Turbine wheel
16 Compressor wheel
18 Bearing part
20 Turbine housing
22 Compressor cover
24 Bearing housing
26 Variable nozzle structure
28 Nozzle plate
30 Nozzle mount
32 Exhaust gas flow passage
34 Nozzle vane
36 Support shaft
38 Drive part
39 Connecting part
40 Actuator
42 (42a, 42b) Cooling gas passage
43 Inlet side opening
44 Outlet side opening
45 Drive ring
46 Lever plate
48 Nozzle support
50 Diffuser flow passage
51 Scroll flow passage
52 Through hole (first through hole)
54 External pipe
56, 58 Flow passage
60 Check valve
62 Perforated plate
64 Through hole
66 Cooling water passage
68 Through hole (second through hole)
70 Through hole (third through hole)
72 Exhaust gas outlet flow passage
B Boundary
$R_1$ Radially outer region
$R_2$ Radially inner region
$S_1$ Space (one side space)
$S_2$ Space (another side space)
Si Internal space
e Exhaust gas
g Compressed gas

The invention claimed is:

1. A variable geometry turbocharger, comprising:
a rotational shaft;
a turbine wheel disposed on one end side of the rotational shaft;
a compressor wheel disposed on another end side of the rotational shaft;
a bearing housing for housing a bearing part for rotatably supporting the rotational shaft;
a variable nozzle structure for controlling a flow rate of an exhaust gas flowing into the turbine wheel, the variable nozzle structure including
a nozzle plate and nozzle mount that define an exhaust gas flow passage for allowing the exhaust gas to flow into the turbine wheel,
a nozzle vane disposed rotatably about a support shaft in the exhaust gas flow passage, and
a drive part for rotating the nozzle vane, the drive part including a drive ring and a lever plate and being disposed in an internal space defined between the bearing housing and the nozzle mount; and
a cooling gas passage for extracting compressed gas compressed by the compressor wheel and introducing the compressed gas into the internal space,
wherein the cooling gas passage has an outlet side opening communicating with the internal space, and
wherein the variable geometry turbocharger further comprises a perforated plate dividing the internal space along an axial direction of the rotational shaft, the perforated plate being disposed in the internal space such that the drive part is disposed in one side space formed on one side of the perforated plate and the outlet side opening communicates with another side space formed on another side of the perforated plate.

2. The variable geometry turbocharger according to claim 1,
wherein the cooling gas passage has an inlet side opening communicating with an outlet side region of a diffuser flow passage where the compressor wheel is housed.

3. The variable geometry turbocharger according to claim 1,
wherein the bearing housing has a first through hole penetrating along an axial direction of the rotational shaft, and
wherein the first through hole constitutes a part of the cooling gas passage.

4. The variable geometry turbocharger according to claim 1, further comprising:
a compressor cover for housing the compressor wheel; and
an external pipe disposed between the compressor cover and the bearing housing,
wherein the external pipe constitutes a part of the cooling gas passage.

5. The variable geometry turbocharger according to claim 1,
wherein the perforated plate is configured such that an opening ratio of a radially inner region is greater than an opening ratio of a radially outer region.

6. The variable geometry turbocharger according to claim 1,
wherein a face of the perforated plate facing the another side space is configured to have a higher emissivity than a surface of the nozzle mount.

7. The variable geometry turbocharger according to claim 1, wherein the nozzle mount has a second through hole causing the internal space to communicate with the exhaust gas flow passage, the compressed gas introduced into the internal space being configured to be introduced into the exhaust gas flow passage through the second through hole.

8. The variable geometry turbocharger according to claim 1,
wherein the turbine wheel has a third through hole which causes a back surface side of the turbine wheel to communicate with an exhaust gas outlet flow passage formed downstream of the turbine wheel.

* * * * *